United States Patent
Sugiyama et al.

(10) Patent No.: US 9,874,955 B2
(45) Date of Patent: Jan. 23, 2018

(54) VIBRATION CONTROL DEVICE, TOUCH PANEL INPUT APPARATUS, AND VIBRATION CONTROL METHOD

(71) Applicant: Panasonic Intellectual Property Corporation of America, Torrance, CA (US)

(72) Inventors: Masashi Sugiyama, Osaka (JP); Takayuki Nishikawa, Osaka (JP); Yoichi Nishida, Osaka (JP); Ryo Yokoyama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 321 days.

(21) Appl. No.: 14/737,726

(22) Filed: Jun. 12, 2015

(65) Prior Publication Data
US 2015/0277612 A1    Oct. 1, 2015

Related U.S. Application Data

(63) Continuation of application No. PCT/JP2013/007396, filed on Dec. 17, 2013.

(30) Foreign Application Priority Data

Dec. 21, 2012    (JP) ................. 2012-279743

(51) Int. Cl.
*G09G 1/00*    (2006.01)
*G06F 3/041*    (2006.01)
(Continued)

(52) U.S. Cl.
CPC .............. *G06F 3/041* (2013.01); *G06F 3/016* (2013.01); *G06F 3/0488* (2013.01); *G06F 3/16* (2013.01)

(58) Field of Classification Search
CPC .......... G08B 6/00; G09G 21/00; G06F 3/016; G06F 3/0416; G06F 3/0488; G06F 3/041; G06F 3/044
See application file for complete search history.

(56) References Cited

U.S. PATENT DOCUMENTS 8,903,097 B2 *  12/2014  Kemmochi ........... H04M 9/082
                                                      381/101
2003/0067449 A1    4/2003  Yoshikawa et al.
(Continued)

FOREIGN PATENT DOCUMENTS

CN        102164203        8/2011
CN        102246122        11/2011
(Continued)

OTHER PUBLICATIONS

English Translation of Chinese Search Report dated Dec. 23, 2016 for the related Chinese Patent Application No. 201380053600.8.
(Continued)

*Primary Examiner* — Michael Faragalla
(74) *Attorney, Agent, or Firm* — McDermott Will & Emery LLP

(57) ABSTRACT

In the use of a touch panel which vibrates in synchronization with a touch operation, discomfort caused by a panel vibration sound is reduced while an operational feeling of a touch operation on the touch panel being maintained. A vibration control device that is used for a touch panel which vibrates in synchronization with a touch operation, includes a sound data acquirer that acquires sound data of a surrounding sound of the touch panel; a predominant frequency acquirer that extracts a predominant frequency of the surrounding sound from the acquired sound data; a consonant sound determiner that determines a consonant sound frequency based on the extracted predominant frequency, the consonant sound frequency being a frequency of a sound which is in consonant with a sound having the extracted predominant (Continued)

frequency; and a vibrational frequency setter that sets a vibrational frequency of the touch panel to the determined consonant sound frequency.

10 Claims, 12 Drawing Sheets

(51) Int. Cl.
*G06F 3/0488* (2013.01)
*G06F 3/01* (2006.01)
*G06F 3/16* (2006.01)

(56) References Cited

U.S. PATENT DOCUMENTS

| | | |
|---|---|---|
| 2006/0055515 A1 | 3/2006 | Yatsu et al. |
| 2010/0148944 A1* | 6/2010 | Kim ................. G06F 3/016 340/407.1 |
| 2011/0200210 A1 | 8/2011 | Kemmochi |

FOREIGN PATENT DOCUMENTS

| | | |
|---|---|---|
| JP | 2003-122507 | 4/2003 |
| JP | 2006-079136 | 3/2006 |
| JP | 2008-130055 | 6/2008 |

OTHER PUBLICATIONS

International Search Report of PCT application No. PCT/JP2013/007396 dated Mar. 18, 2014.
Takao Umemoto "Psychology of Music" Seishin-shobou, pp. 118-145, Jun. 28, 1966.

* cited by examiner

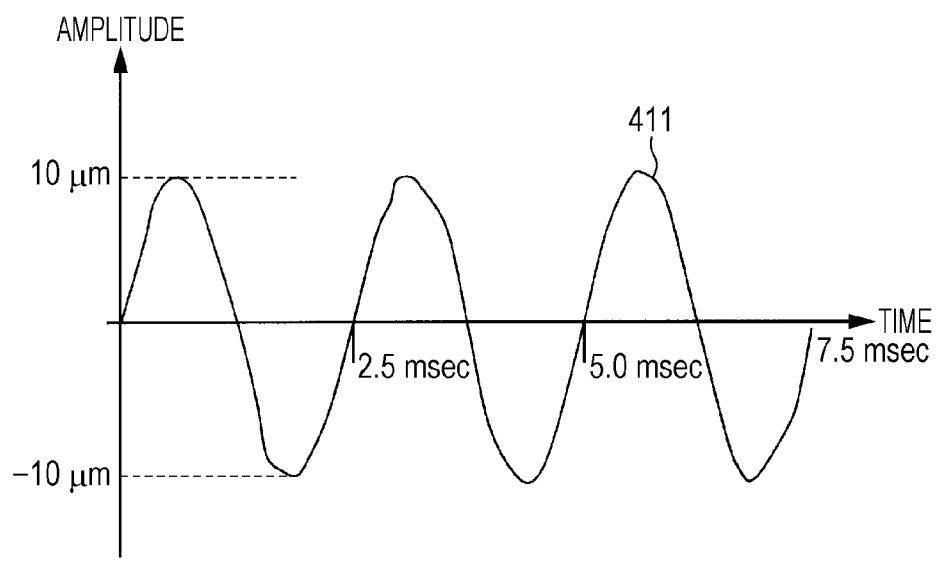

| DEGREE | FREQUENCY RATIO |
|---|---|
| PERFECT EIGHTH | 1 : 2 |
| PERFECT FIFTH | 2 : 3 |
| PERFECT FOURTH | 3 : 4 |
| MAJOR THIRD | 4 : 5 |
| MINOR THIRD | 5 : 6 |
| PERFECT FIRST | 1 : 1 |

441 — DEGREE column
442 — FREQUENCY RATIO column

| REGION IDENTIFIER (521) | X-COORDINATE MINIMUM VALUE (522) | Y-COORDINATE MINIMUM VALUE (523) | X-COORDINATE MAXIMUM VALUE (524) | Y-COORDINATE MAXIMUM VALUE (525) |
|---|---|---|---|---|
| FIRST OPERATION BUTTON | 200 | 200 | 300 | 300 |
| SECOND OPERATION BUTTON | 400 | 200 | 500 | 300 |
| THIRD OPERATION BUTTON | 200 | 400 | 300 | 500 |
| FOURTH OPERATION BUTTON | 400 | 400 | 500 | 500 |
| FIFTH OPERATION BUTTON | 200 | 600 | 300 | 700 |
| SIXTH OPERATION BUTTON | 400 | 600 | 500 | 700 |
| SEVENTH OPERATION BUTTON | 400 | 800 | 500 | 900 |

| REGION IDENTIFIER (531) | VIBRATION NECESSITY (532) |
|---|---|
| FIRST OPERATION BUTTON | YES |
| SECOND OPERATION BUTTON | YES |
| THIRD OPERATION BUTTON | YES |
| FOURTH OPERATION BUTTON | YES |
| FIFTH OPERATION BUTTON | YES |
| SIXTH OPERATION BUTTON | YES |
| SEVENTH OPERATION BUTTON | NO |

| REGION IDENTIFIER (541) | FREQUENCY DEFAULT VALUE (542) | ACCEPTABLE ERROR RANGE (543) |
|---|---|---|
| FIRST OPERATION BUTTON | 140 Hz | ±15% |
| SECOND OPERATION BUTTON | 270 Hz | ±15% |
| THIRD OPERATION BUTTON | 350 Hz | ±15% |
| FOURTH OPERATION BUTTON | 600 Hz | ±15% |
| FIFTH OPERATION BUTTON | 800 Hz | ±15% |
| SIXTH OPERATION BUTTON | 60 Hz | ±15% |
| SEVENTH OPERATION BUTTON | 0 Hz | ±0% |

460

| |
|---|
| 50.0 Hz |
| 200.0 Hz |
| 66.7 Hz |
| 150.0 Hz |
| 75.0 Hz |
| 133.3 Hz |
| 80.0 Hz |
| 125.0 Hz |
| 83.3 Hz |
| 120.0 Hz |
| 100.0 Hz |

430a

| | | |
|---|---|---|
| 433 | DURATION TIME LOWER LIMIT | 500 msec |
| 434 | FREQUENCY ACCEPTABLE ERROR | WITHIN PLUS OR MINUS 5% |

VIBRATION CONTROL DEVICE, TOUCH PANEL INPUT APPARATUS, AND VIBRATION CONTROL METHOD

BACKGROUND

1. Technical Field

The present disclosure relates to a vibration control device and a vibration control method used for a touch panel which vibrates in synchronization with a touch operation.

2. Description of the Related Art

In recent years, in various touch panel input apparatuses, such as a smartphone and a tablet terminal, including a touch panel, the touch panel has often been made to vibrate in synchronization with a touch operation (see, for example, Japanese Unexamined Patent Application Publication No. 2003-122507). Such vibrations of the touch panel may provide a touch operation with tactile feedback, and may complement an operational feeling (for example, a click feeling, a tactile feeling, etc.) obtained in a conventional key switch operation.

However, vibrations of a touch panel (hereinafter, referred to as "panel vibrations", where appropriate) may be propagated to another part of the touch panel input apparatus, a desk on which the touch panel input apparatus is placed, or the like and may generate a vibration sound. Normally, the frequency of such a vibration sound generated by panel vibrations (hereinafter, referred to as a "panel vibration sound", where appropriate) corresponds to the frequency of panel vibrations. Originally, panel vibration sound is unwanted sound and may make an operator and people around the touch panel feel discomfort.

A technique for producing panel vibrations at a frequency which is not easily propagated to human ears is described, for example, in Japanese Unexamined Patent Application Publication No. 2006-79136. Furthermore, a technique for making it difficult to hear a panel vibration sound by separately producing a high-frequency sound is described, for example, in Japanese Unexamined Patent Application Publication No. 2008-130055. The above techniques may reduce the discomfort caused by a panel vibration sound.

However, the related arts have a problem that it is difficult to achieve both a reduction of the discomfort caused by a panel vibration sound and maintenance of an operational feeling of a touch operation on a touch panel at the same time.

This is because the reasons described below. Normally, the audible range of human ears is between 20 Hz and 20,000 Hz. Meanwhile, the band of vibrations in which an operational feeling of a touch operation can be sufficiently obtained without adversely affecting other functions of a touch panel input apparatus is normally between about 50 and about 400 Hz (see Japanese Unexamined Patent Application Publication No. 2008-130055). That is, the frequency of panel vibrations which is able to provide an operational feeling mostly overlap with the audible range of human ears. Furthermore, a certain degree of vibration intensity is required to obtain an operational feeling, and therefore the volume of a high-frequency sound needs to be increased by the amount corresponding to the vibration intensity. That is, separately producing a high-frequency sound may make an operator and people around the touch panel feel more discomfort.

SUMMARY

One non-limiting and exemplary embodiment achieves a reduction of discomfort caused by a panel vibration sound while maintaining an operational feeling of a touch operation in the use of a touch panel which vibrates in synchronization with a touch operation.

In one general aspect, the techniques disclosed here feature a vibration control device that is used for a touch panel which vibrates in synchronization with a touch operation, the device including a sound data acquirer that acquires sound data of a surrounding sound of the touch panel; a predominant frequency acquirer that extracts a predominant frequency of the surrounding sound from the acquired sound data; a consonant sound determiner that determines a consonant sound frequency based on the extracted predominant frequency, the consonant sound frequency being a frequency of a sound which is in consonant with a sound having the extracted predominant frequency; and a vibrational frequency setter that sets a vibrational frequency of the touch panel to the determined consonant sound frequency.

The present disclosure achieves a reduction of discomfort caused by a panel vibration sound while maintaining an operational feeling of a touch operation in the use of a touch panel which vibrates in synchronization with a touch operation.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a waveform chart illustrating an example of a vibration waveform of the touch panel in the second embodiment;

FIG. 5 is a diagram illustrating an example of predominant frequency conditions in the second embodiment;

FIG. 6 is a diagram illustrating an example of a consonant sound frequency ratio list in the second embodiment;

FIG. 8 is a diagram illustrating an example of coordinate range information in the second embodiment;

FIG. 9 is a diagram illustrating an example of vibration necessity information in the second embodiment;

FIG. 10 is a diagram illustrating an example of regional frequency information in the second embodiment;

DETAILED DESCRIPTION

Hereinafter, embodiments of the present disclosure will be described in detail with reference to the drawings.

First Embodiment

A first embodiment of the present disclosure is an example of a fundamental aspect of the present disclosure.

Figure 1:
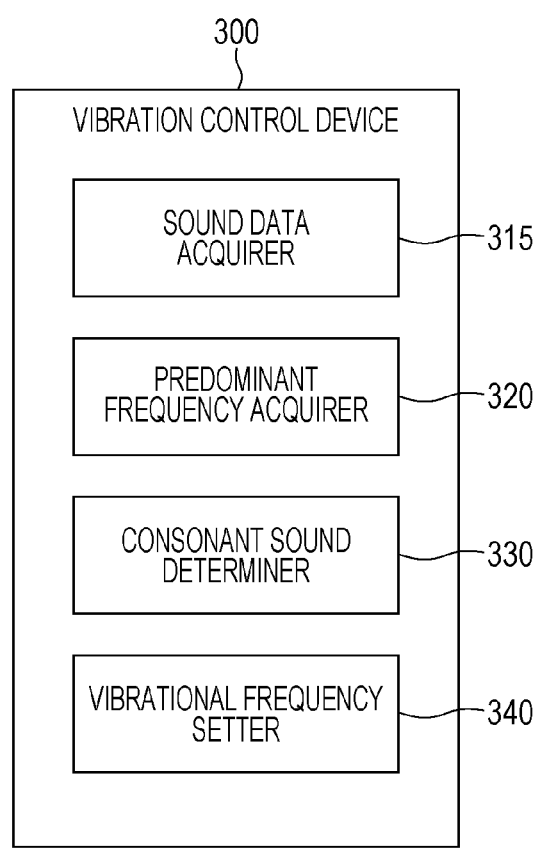
FIG. 1 is a block diagram illustrating an example of a configuration of a vibration control device according to a first embodiment of the present disclosure.

FIG. 1 is a block diagram illustrating an example of a configuration of a vibration control device according to the first embodiment.

A vibration control device 300 illustrated in FIG. 1 is a device used for a touch panel which vibrates in synchronization with a touch operation. In FIG. 1, the vibration control device 300 includes a sound data acquirer 315, a predominant frequency acquirer 320, a consonant sound determiner 330, and a vibrational frequency setter 340.

The sound data acquirer 315 acquires sound data of a surrounding sound of a touch panel (hereinafter, simply referred to as a "surrounding sound").

The predominant frequency acquirer 320 extracts a predominant frequency of the surrounding sound from the acquired sound data. The predominant frequency of the surrounding sound is a frequency of a sound which is perceived by a person who hears the surrounding sound as a main component of the surrounding sound.

The consonant sound determiner 330 determines a consonant sound frequency, which is a frequency of a sound which is in consonant with the sound at the extracted predominant frequency (hereinafter, referred to as a "predominant sound").

The vibrational frequency setter 340 sets the vibrational frequency of the touch panel to the determined consonant sound frequency.

The vibration control device 300 includes, although not illustrated in FIG. 1, for example, a central processing unit (CPU), a storage medium, such as a read only memory (ROM), which stores a control program and various data, and a working memory, such as a random access memory (RAM). In this case, functions of the above sections are implemented when the CPU executes the control program.

The amount of discomfort caused by a consonant sound provided to people who hear the sound is smaller than individual sounds that constitute the consonant sound. Therefore, if the panel vibration sound is in consonant with the predominant sound of the surrounding sound, the discomfort caused by the panel vibration sound provided to an operator and people around the touch panel is reduced. Furthermore, compared to silence, a consonant sound may provide comfort to people who hear the sound.

Meanwhile, conditions of the surrounding sound vary depending on the time and location. Accordingly, the predominant frequency of the surrounding sound is unspecified. Therefore, the panel vibration sound is not, in most cases, in consonant with the predominant sound contained in the surrounding sound and can be merely an acoustic noise.

The vibration control device 300 according to the first embodiment sets, as described above, the frequency of panel vibrations in such a manner that the panel vibration sound is in consonant with the predominant sound contained in the surrounding sound.

Thus, the vibration control device 300 according to the first embodiment can, while maintaining the frequency of panel vibrations within an audible range, reduce discomfort caused by the panel vibration sound provided to people, without outputting another high-frequency sound. That is, the vibration control device 300 according to the first embodiment achieves a reduction of the discomfort caused by the panel vibration sound while maintaining an operational feeling of a touch operation in the use of a touch panel which vibrates in synchronization with a touch operation.

Furthermore, the vibration control device 300 according to the first embodiment can increase the range of the frequency band that can be used for panel vibrations, compared to the technique described in Japanese Unexamined Patent Application Publication No. 2006-79136. That is, in the vibration control device 300 according to the first embodiment, the wider the range of the frequency band that can be used for panel vibrations, the wider the range of types of tactile perception that can be transmitted to the operator. Therefore, the vibration control device 300 according to the first embodiment can, for example, set vibrations of different frequencies to multiple operational contents so that the operator can perceive the differences among the vibrations.

Furthermore, since the vibration control device 300 according to the first embodiment does not need to output a high-frequency sound separately, an increase in power consumption can be suppressed compared to the technique described in Japanese Unexamined Patent Application Publication No. 2008-130055.

Second Embodiment

A second embodiment of the present disclosure is an example of a concrete aspect of the present disclosure for a case where the present disclosure is applied to a touch panel input apparatus.

<Configuration of Touch Panel Input Apparatus>

Figure 2:
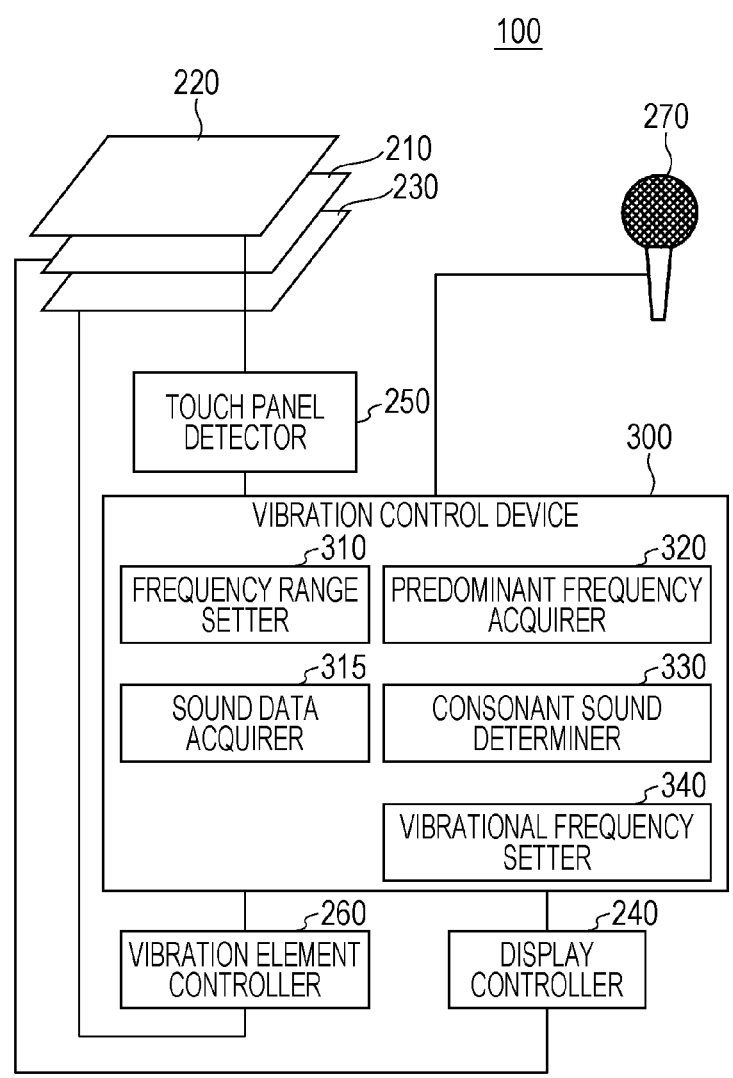
FIG. 2 is a block diagram illustrating an example of a configuration of a touch panel input apparatus according to a second embodiment of the present disclosure.

FIG. 2 is a block diagram illustrating an example of a configuration of a touch panel input apparatus which includes a vibration control device according to the second embodiment of the present disclosure.

In FIG. 2, a touch panel input apparatus 100 includes a display 210, a touch panel 220, a vibration element 230, a display controller 240, a touch panel detector 250, a vibration element controller 260, a microphone 270, and the vibration control device 300.

The display 210 displays an image based on image data received from the display controller 240, which will be described later. Concrete examples of the display 210 include a liquid crystal display (LCD), an organic electro luminescence (EL) display, and a light emitting diode (LED) display.

The touch panel 220 is arranged on the surface of the display 210 and receives a touch operation (press down input). Every time a touch operation is performed, the touch panel 220 outputs to the touch panel detector 250, which will be described later, an operation signal indicating the position of the touch operation. The operation signal is, for example, a signal indicating a voltage value on the X-axis and a voltage value on the Y-axis of the touch panel 220. Concrete examples of the touch panel 220 include a resistive-film-type touch panel formed of film and plastic.

The vibration element 230 is arranged on the rear surface of the display 210, and generates vibrations based on a vibration control signal received from the vibration element controller 260, which will be described later. The frequency of vibrations generated by the vibration element 230 is assumed to be variable, at least, within a frequency range described later. Specifically, examples of the vibration element 230 include a piezo-actuator vibration element, a vibration element of a linear resonant actuator (LRA) method, and a vibrator.

The display controller 240 performs display control of an image displayed on the display 210. Specifically, the display controller 240 generates image data of an image to be displayed on the display 210, and outputs the generated image data to the display 210. Furthermore, the display controller 240 outputs to the vibration control device 300 operation target information indicating operation content that can be input by a touch operation on the image.

In the second embodiment, the display controller 240 causes the display 210 to display an image on which multiple buttons are provided. Then, the display controller 240 outputs to the vibration control device 300 coordinate range information and vibration necessity information as the operation target information mentioned above. The coordinate range information is information indicating positions of individual buttons displayed on the display controller 240 (hereinafter, referred to as "display positions"). The vibration necessity information is information indicating whether or not individual buttons require vibrational feedback to an operation (hereinafter, referred to as a "vibration required button").

The vibration control device 300 stores the received coordinate range information and vibration necessity information in a memory that can be referenced by the individual sections of the vibration control device 300.

The touch panel detector 250 performs, based on an operation signal received from the touch panel 220, detection of the position of a touch operation on the touch panel 220 performed on the touch panel 220 (hereinafter, simply referred to as a "touch operation"). For example, the touch panel detector 250 converts the operation signal into a digital value to obtain the X-coordinate and the Y-coordinate on the touch panel 220.

In the second embodiment, the correspondence between the position on the touch panel 220 and the position on the display 210 is set beforehand in the touch panel detector 250. Based on the correspondence, the touch panel detector 250 detects the position of a touch operation on the display 210. Then, the touch panel detector 250 outputs to the vibration control device 300 information indicating the position of a touch operation on the display 210 (hereinafter, referred to as "operation position information").

The vibration element controller 260 vibrates the vibration element 230 in synchronization with a touch operation based on a vibration instruction signal received from the vibration control device 300, which will be described later. That is, the vibration element controller 260 forms, together with the vibration element 230 described above, a vibration generator of the present disclosure, and causes the touch panel 220 to generate vibrations in synchronization with a touch operation. Furthermore, the vibration element controller 260 controls the frequency of the vibrations based on the vibration instruction signal mentioned above.

The microphone 270 is arranged in the vicinity of the touch panel 220, and a surrounding sound of the touch panel 220 (hereinafter, simply referred to as a "surrounding sound") is input to the microphone 270. Then, the microphone 270 outputs sound data of the received surrounding sound to the vibration control device 300. The sound data is, for example, time-series data of a sound pressure level detected by the microphone 270.

The vibration control device 300 includes a frequency range setter 310, the sound data acquirer 315, the predominant frequency acquirer 320, the consonant sound determiner 330, and the vibrational frequency setter 340.

The frequency range setter 310 acquires operation content that can be input by a touch operation, and sets a frequency range and a frequency default value for the acquired operation content. However, in the case where multiple operation contents exist, the frequency range setter 310 sets different frequency ranges and different frequency default values for the multiple operation contents. Furthermore, the frequency range setter 310 sets a frequency range in a frequency band of vibrations in which an operational feeling of a touch operation can be sufficiently obtained (for example, 50 Hz to 400 Hz) without adversely affecting other functions of the touch panel input apparatus.

The above frequency range and frequency default value are used by the consonant sound determiner 330, which will be described later, when determining the frequency of vibrations of the vibration element 230.

In the second embodiment, the frequency range setter 310 acquires the display position of a vibration required button from the operation target information (coordinate range information and vibration necessity information) received from the display controller 240. Then, the frequency range setter 310 sets a frequency range and a frequency default value for each vibration required button. That is, in the second embodiment, "operation content that can be input by a touch operation" corresponds to each vibration required button.

Then, the frequency range setter 310 stores information indicating the frequency range and the frequency default value set for each vibration required button (hereinafter, referred to as "regional frequency information") into a memory which can be referenced by the individual sections of the vibration control device 300.

The sound data acquirer 315 acquires sound data received from the microphone 270, and transfers the sound data to the predominant frequency acquirer 320.

The predominant frequency acquirer 320 determines, based on the sound data transferred from the sound data acquirer 315, whether or not the predominant frequency is present in the surrounding sound. When the predominant frequency is present in the surrounding sound, the predominant frequency acquirer 320 extracts the predominant frequency of the surrounding sound from the sound data. Then, the predominant frequency acquirer 320 notifies the consonant sound determiner 330 of the extracted predominant frequency.

The consonant sound determiner 330 determines, based on the predominant frequency notified by the predominant frequency acquirer 320, a frequency of the sound (hereinafter, referred to as "consonant sound frequency") that is in consonant with the sound at the extracted predominant frequency. Then, the consonant sound determiner 330 notifies the vibrational frequency setter 340 of the determined consonant sound frequency.

Every time a touch operation is performed, the vibrational frequency setter 340 acquires a frequency range and a frequency default value set beforehand for the operation content of the touch operation. The vibrational frequency setter 340 performs the acquisition of the frequency range and the frequency default value, based on the operation signal received from the touch panel detector 250 and the regional frequency information generated by the frequency range setter 310.

Then, the vibrational frequency setter 340 determines whether or not the consonant sound frequency notified by the consonant sound determiner 330 is included in the acquired (preset) frequency range. When the consonant sound frequency is included in the frequency range, the vibrational frequency setter 340 sets the frequency of panel vibrations to the consonant sound frequency. When the consonant sound frequency is not included in the frequency range, the vibrational frequency setter 340 sets the frequency of panel vibrations to the frequency default value.

Then, the vibrational frequency setter 340 generates a vibration instruction signal which instructs the vibration element 230 to vibrate for a specific period of time at the determined frequency, and outputs the generated vibration instruction signal to the vibration element controller 260. That is, the vibrational frequency setter 340 causes the touch panel 220, through the vibration element controller 260 and the vibration element 230, to vibrate at the frequency which is in consonant with the sound at the predominant frequency of the surrounding sound, in synchronization with a touch operation.

The touch panel input apparatus 100 includes, although not illustrated in FIG. 2, for example, a CPU, a storage medium, such as a ROM, which stores a control program and various data, and a working memory, such as a RAM. In this case, functions of the above sections are implemented when the CPU executes the control program.

The touch panel input apparatus 100 having such a configuration is able to display a screen which includes multiple buttons, receive touch operations on the buttons, and cause the touch panel 220 to vibrate in synchronization with the touch operations. Furthermore, the touch panel input apparatus 100 is able to set the frequency of panel vibrations in such a manner that the panel vibration sound is in consonant with the sound at the predominant frequency of the surrounding sound. Furthermore, the touch panel input apparatus 100 is able to generate panel vibrations at different frequencies for individual buttons by setting the frequency ranges and the frequency default values for the individual buttons.

The panel vibration sound, the predominant frequency, and the consonant sound will be explained below.

<Explanation of Panel Vibration Sound>

Figure 3:
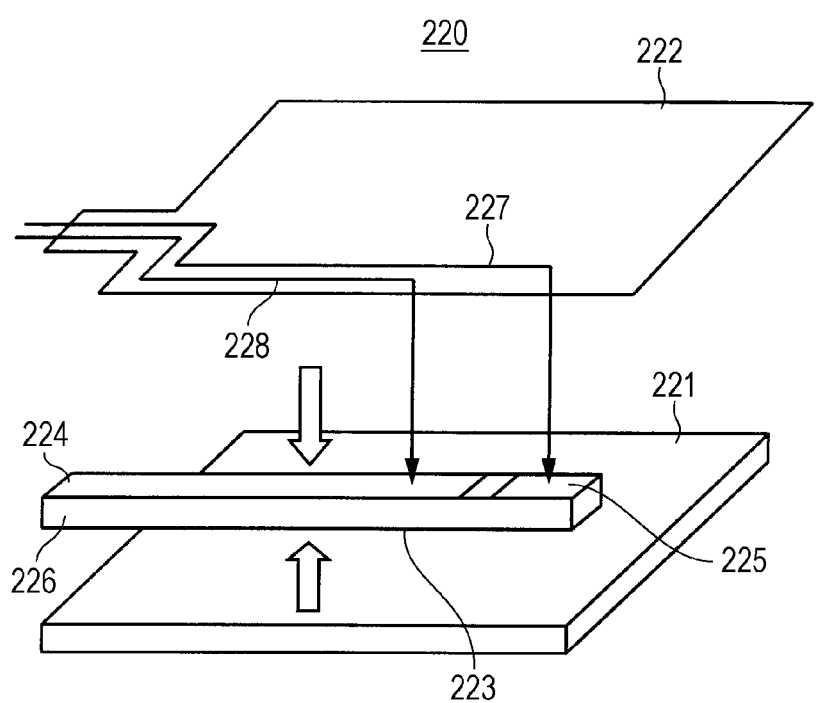
FIG. 3 is a diagram schematically illustrating an example of a configuration of a touch panel in the second embodiment.

FIG. 3 is a schematic diagram illustrating an example of a configuration of the touch panel 220.

As illustrated in FIG. 3, the touch panel 220 includes a supporting substrate 221 and a movable plate 222, between which a piezoelectric element 226 is placed. The piezoelectric element 226 includes a first driving electrode 223, a second driving electrode 224, and a Y-application-side lead electrode 225. On the movable plate 222, a first lead wire 227 that allows connection with the Y-application-side lead electrode 225 and a second lead wire 228 that allows connection with the second driving electrode 224 are arranged for each piezoelectric element 226.

The vibrations generated at the vibration element 230 illustrated in FIG. 2 are propagated to the movable plate 222 of the touch panel 220 and transmitted to a finger of a person who is performing a touch operation. Due to the vibrations, the movable plate 222 comes to serve as a surface sound source, and the panel vibration sound described above is generated.

FIG. 4 is a waveform chart illustrating an example of a vibration waveform of the touch panel 220. In FIG. 4, the vertical axis represents amplitude [μm] and the horizontal axis represents time [msec].

As illustrated in FIG. 4, the touch panel 220 vibrates, for example, as a sine wave 411 with an amplitude of 10 μm and a cycle of 2.5 msec (that is, a frequency of 400 Hz). In this case, the touch panel 220 generates a panel vibration sound of 400 Hz, which is the same frequency as the vibrational frequency. Such a panel vibration sound is within the human audible range, and may make the operator and people around the touch panel feel discomfort, as described above.

The touch panel input apparatus 100 according to the second embodiment sets, as described above, the frequency of panel vibrations in such a manner that the panel vibration sound and the sound at the predominant frequency which is present in the surrounding sound constitute a consonant sound.

<Explanation of Predominant Frequency>

In the second embodiment, the predominant frequency of a surrounding sound represents a frequency of a sound which is perceived as a main component of the surrounding sound by a person who hears the surrounding sound.

The predominant frequency acquirer 320 illustrated in FIG. 2 determines, based on predominant frequency conditions in which conditions for the predominant frequency are defined, whether or not the predominant frequency is present in the surrounding sound. The predominant frequency conditions include a condition that the predominant frequency is within a frequency range of a sound whose musical interval can be perceived by people. The predominant frequency acquirer 320 stores, for example, the predominant frequency conditions beforehand.

<Predominant Frequency Conditions>

FIG. 5 is a diagram illustrating an example of predominant frequency conditions.

As illustrated in FIG. 5, in predominant frequency conditions 430, for example, a sound pressure level 431 of "40 dB or more" and a frequency range 432 of "20 Hz to 1000 Hz" are defined as conditions for the predominant frequency.

In the second embodiment, by using the predominant frequency conditions 430, a sound which is too quiet for people to hear or a sound which is in a frequency range which is difficult for people to hear can be excluded from an extraction target for the predominant frequency.

A consonant sound is a combination of multiple sounds with a frequency ratio of a perfect first, a frequency ratio of a minor third, a frequency ratio of a major third, a frequency ratio of a perfect fourth, a frequency ratio of a perfect fifth, or a frequency ratio of a perfect eighth. Furthermore, a consonant sound can be formed even when a sound forming the consonant sound is replaced with an N octave(s) higher or lower sound (N is a natural number). That is, a frequency ratio obtained by multiplying or dividing the above frequency ratio by an integer multiple of 2 is also a frequency ratio of two sounds constituting a consonant sound.

That is, a consonant sound is, in an acoustic sense, multiple sounds that have a frequency ratio equal to the quotient of two natural numbers less than or equal to six, a frequency ratio obtained by multiplying the frequency ratio by an integer multiple of 2, or a frequency ratio obtained by dividing a frequency ratio equal to the quotient of two natural numbers less than or equal to six by an integer multiple of 2. However, each of such a consonant sound has a unique acceptable range. In the second embodiment, the consonant sound refers to, in particular, from among the above consonant sounds, a combination of multiple sounds within the acceptable range.

For example, when a piano key of "C" is pressed and a listener hears the sound as "C", then the frequency of the sound forms a frequency ratio of a consonant sound. The "frequency ratio of a consonant sound" refers to a frequency ratio which is regarded as a musical interval which is in consonant when the frequency ratio is replaced with the musical interval of an equal temperament, that is, a range of frequency ratio acceptable by a listener as a consonant sound.

When a piano key of "C" is pressed and the sound is a little out of the original pitch of "C" because of poor tuning, the listener may still hear the sound as "C". Furthermore, even when a sound of the note "C" is produced by a string instrument or human voice and the sound fluctuates slightly from the original pitch of "C" because vibrato is applied, the listener may still hear the sound as "C". In the second embodiment, such a deviation is within an acceptable range, and the frequency of such a sound forms the frequency ratio of a consonant sound.

On the other hand, in the case where a sound is outside the acceptable range of the frequency ratio of a consonant sound, when a piano key of "C" is pressed and the sound is a little out of the original pitch of "C" because of poor tuning, the sound may be heard as a different pitch. Specifically, the sound may be heard as "C#", "D", "B", or "Bb".

The relationship between the frequency ratio and the acceptable range for such a consonant sound is known to those skilled in the art (for example, see Takao UMEMOTO, "Ongaku Shinrigaku (Psychology of Music)", Chapter 2, Section 3, "Kyowa ni Kansuru Jikkenteki Chiken (Experimental Perception on Consonance)", Seishin Shobo, Jun. 28, 1966). Therefore, detailed explanations will be omitted.

The "frequency ratio of a consonant sound" in the second embodiment is, as described above, not limited to within one octave, but encompasses any consonant sound and all of the acceptable range of the consonant sound in musical instrument acoustics.

For example, when a piano key of "C" and a piano key of "G" are pressed at the same time, a consonant sound of a perfect fifth is produced. When a piano key of "C" and a piano key of "G" of one octave higher are pressed, the sound produced is still within the consonant sound range. Furthermore, when a piano key of "C" and a piano key of "G" of two octaves higher are pressed, the sound is also within the consonant sound range.

The amount of discomfort caused by a consonant sound provided to people who hear the sound is smaller than individual sounds that constitute the consonant sound. Furthermore, compared to silence, a consonant sound may provide comfort to people who hear the sound. When a sound in a different octave is included as a candidate for the vibrational frequency of the touch panel 220, a consonant sound can be obtained from a wide bandwidth. However, it is often more comfortable to a listener when the candidate for the vibrational frequency is within one octave.

The consonant sound determiner 330 illustrated in FIG. 2 determines the consonant sound frequency, based on a consonant sound frequency ratio list in which frequency ratios that can constitute the above consonant sound (hereinafter, referred to as "consonant sound frequency ratios") are described. The consonant sound determiner 330 stores, for example, the consonant sound frequency ratio list beforehand.

<Consonant Sound Frequency Ratio List>

FIG. 6 is a diagram illustrating an example of a consonant sound frequency ratio list.

In FIG. 6, a consonant sound frequency ratio list 440 is a list of ratios of frequencies of two sounds when the two sounds constitute a consonant sound. As illustrated in FIG. 6, the consonant sound frequency ratio list 440 describes, for each consonant sound degree 441, a frequency ratio 442 corresponding to the consonant sound degree 441, as a list entry. In the consonant sound frequency ratio list 440, an entry of the degree 441 is not always required.

However, in the consonant sound frequency ratio list 440, at least one frequency ratio which is different from a frequency ratio of a harmonic is described, from among frequency ratios constituting a consonant sound. The frequency ratio constituting a harmonic is a frequency ratio 1:n (n is an integer multiple of 2).

The frequency ratio 442 may be written in an integral ratio format, as illustrated in FIG. 6, or in other formats such as a decimal format or a fractional format.

In the second embodiment of the present disclosure, the above consonant sound frequency can be determined quickly and easily by referring to the consonant sound frequency ratio list 440 and performing calculation of multiplying a predominant frequency by the consonant sound frequency ratio 442 for each degree 441.

The consonant sound determiner 330 may obtain a frequency of a different octave of the determined consonant sound by multiplying an N-th power of 2 by the consonant sound frequency or by an N-bit left shift operation.

<Concrete Examples of Various Types of Information>

Next, prior to operation of the vibration control device 300, an example of the display screen, an example of the coordinate range information, an example of the vibration necessity information, and an example of the regional frequency information will be described.

<Display Image>

Figure 7:
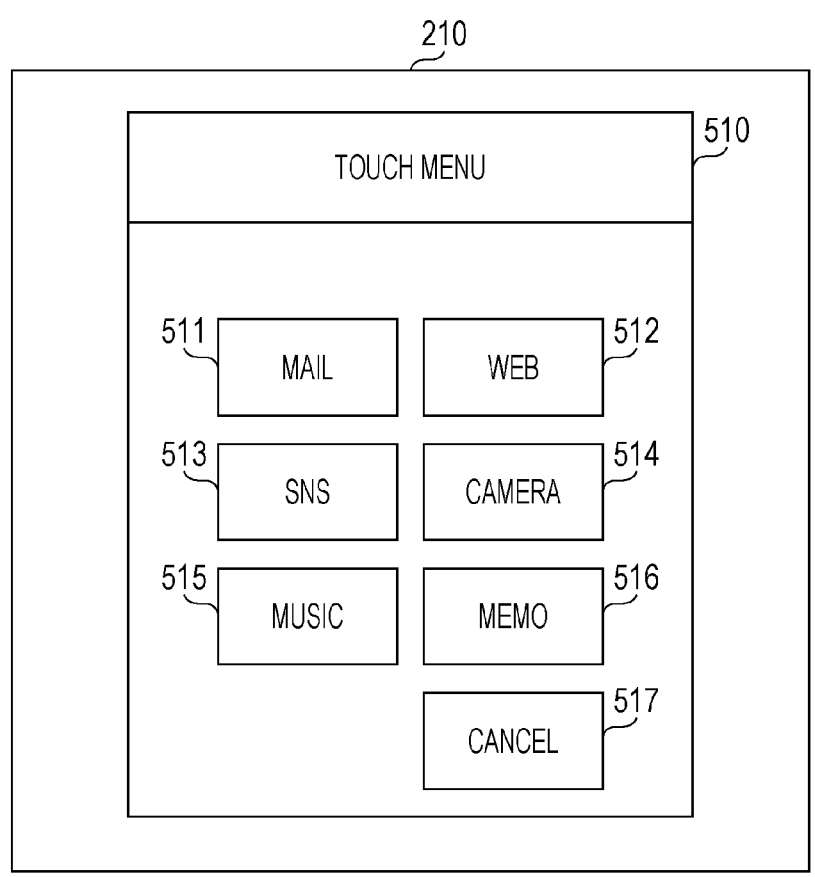
FIG. 7 is a plan view illustrating an example of a display image in the second embodiment.

FIG. 7 is a plan view illustrating an example of an image displayed on the display 210.

As illustrated in FIG. 7, the display 210 displays, for example, a menu screen 510. The menu screen 510 includes a first operation button 511 defined as "Mail", a second operation button 512 defined as "Web", and a third operation button 513 defined as "SNS". The menu screen 510 also includes a fourth operation button 514 defined as "Camera", a fifth operation button 515 defined as "Music", a sixth operation button 516 defined as "Memo", and a seventh operation button 517 defined as "Cancel".

An operator touches (presses down) a region on the touch panel 220 corresponding to a button from among the first to sixth operation buttons 511 to 516, and thereby performs a touch operation on the button.

For example, when the operator wants to start an email application, the operator touches the first operation button 511. When the operator wants to start a Web application, the operator presses down the second operation button 512. The buttons are associated with processing for different purposes. The descriptions of those different purposes will be omitted.

<Coordinate Range Information>

FIG. 8 is a diagram illustrating an example of the coordinate range information generated in association with the display image in FIG. 7. The coordinate range information is, as described above, information generated by the display controller 240, and indicates a display position of each button.

As illustrated in FIG. 8, in the coordinate range information 520, an X-coordinate minimum value 522, a Y-coordinate minimum value 523, an X-coordinate maximum value 524, and a Y-coordinate maximum value 525 are described in association with a region identifier 521. The region identifier 521 is information that identifies an operation part (in this case, the first to sixth operation buttons 511 to 516) displayed on the display 210. The values 522 to 525, which indicate coordinate values, each represent a coordinate range on the display 210 of the region where the operation part is displayed.

The way in which the coordinate range of the coordinate range information 520 is expressed is not limited to the above example. For example, the coordinate range of a round operation button can be expressed by an X-coordinate and a Y-coordinate of a center point, and the radius. Furthermore, an operation button coordinate range of a more complicated shape can be expressed by a data structure representing a curve formed by connecting a plurality of points. Furthermore, the coordinate range may include a Z-coordinate. Accordingly, for example, a state where an X-coordinate and a Y-coordinate are within a specific range and the pressure of a finger exceeds a specific value can be used as a condition for determining that pressing down has been performed.

<Vibration Necessity Information>

FIG. 9 is a diagram illustrating an example of the vibration necessity information. The vibration necessity information is, as described above, information generated by the display controller 240, and indicates whether or not each button is a vibration required button.

As illustrated in FIG. 9, in vibration necessity information 530, vibration necessity 532 is described in association with a region identifier 531 (corresponds to the region identifier 521 in FIG. 8). The vibration necessity 532 indicates whether or not a button is a vibration required button.

In this example, the vibration necessity 532 of "YES" is described in association with the region identifier 531 of the first to sixth operation buttons 511 to 516. Furthermore, the vibration necessity 532 of "NO" is described in association with the region identifier 531 of the seventh operation button 517. This indicates that the first to sixth operation buttons 511 to 516 are vibration required buttons and the seventh operation button 517 is not a vibration required button.

The frequency range setter 310 sets, based on the coordinate range information 520 and the vibration necessity information 530, a frequency range and a frequency default value for each operation button. Then, the frequency range setter 310 notifies the vibrational frequency setter 340 of regional frequency information indicating the set content.

<Regional Frequency Information>

FIG. 10 is a diagram illustrating an example of the regional frequency information. The regional frequency information is, as described above, information generated by the frequency range setter 310, and indicates a frequency range and a frequency default value for each vibration required button.

As illustrated in FIG. 10, in regional frequency information 540, a frequency default value 542 and an acceptable error range 543 are described in association with a region identifier 541 (corresponds to the region identifier 521 in FIG. 8). The range obtained by applying the acceptable error range 543 to the frequency default value 542 is the above frequency range.

For example, in association with the region identifier 541 of the first operation button 511, the frequency default value 542 of "140 Hz" and the acceptable error range 543 of "±15%" are described. This indicates that the frequency range is between 119 Hz and 161 Hz. Furthermore, the frequency default value 542 represents the median of the frequency range.

Furthermore, in association with the region identifier 541 of the seventh operation button 517, the frequency default value 542 of "0 Hz" and the acceptable error range 543 of "0%" are described. This substantially indicates that neither a frequency default value nor a frequency range is set. This is because the seventh operation button 517 is not a vibration required button.

Thus, the regional frequency information 540, and the coordinate range information 520 (see FIG. 8) and the vibration necessity information 530 (see FIG. 9) described above, are stored in the vibration control device 300. Therefore, when a touch operation is performed on any of the operation buttons, the vibration control device 300 is able to specify the frequency range corresponding to the operation button quickly and easily.

The way in which the frequency range and the frequency default value of the regional frequency information 540 are described is not limited to the above example. For example, the frequency range and the frequency default value may be expressed by the minimum value and the maximum value of the frequency range, and by setting the median of the frequency range as the frequency default value.

<Operation of Vibration Control Device>

Next, among operations of the touch panel input apparatus 100, an operation of the vibration control device 300 will be described.

The vibration control device 300 starts an operation described below, for example, every time operation target information for a new image is received from the display controller 240. At this point in time, on the display 210, for example, a menu 510 (FIG. 7) is displayed.

Figure 11:
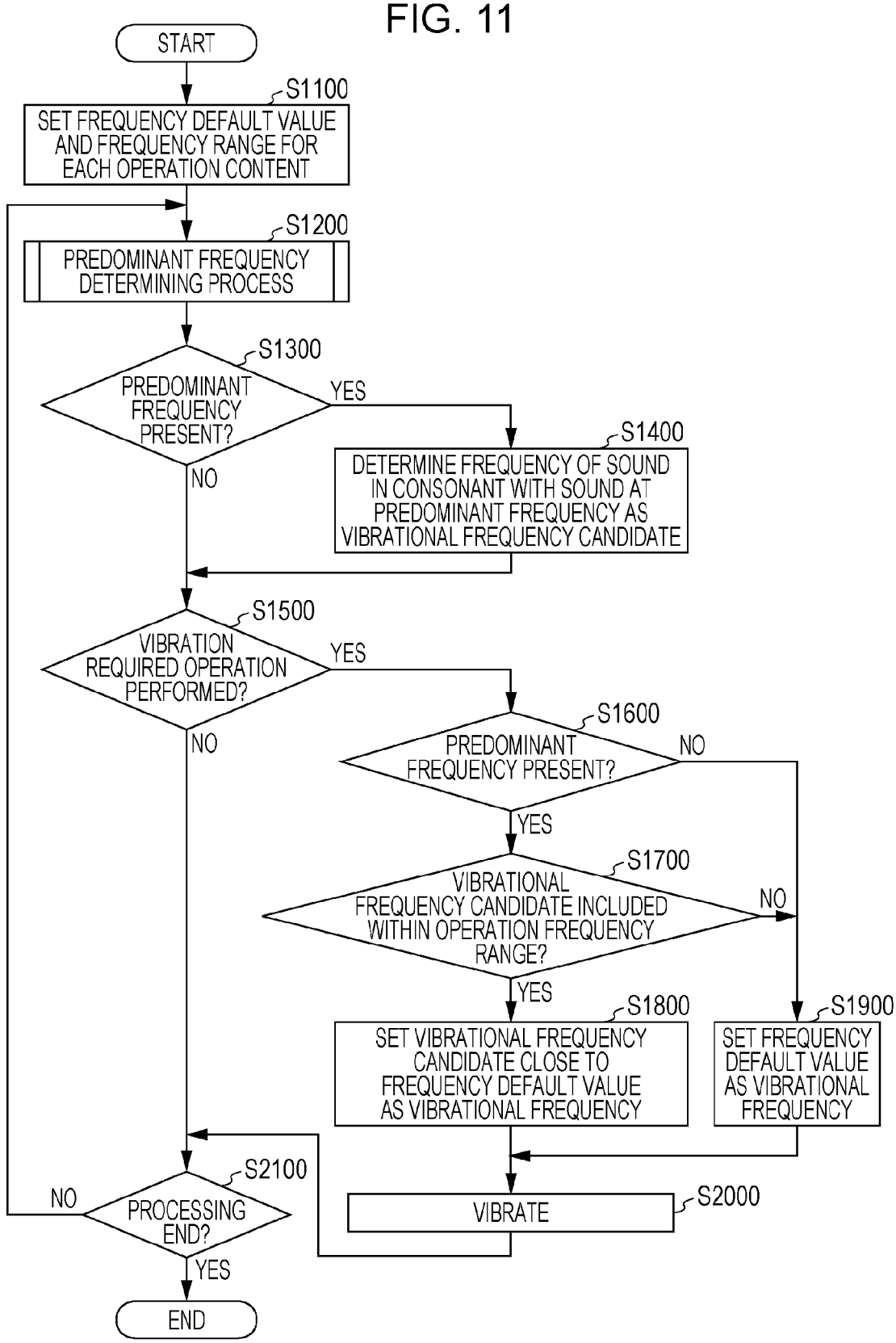
FIG. 11 is a flowchart illustrating an example of an operation of the vibration control device according to the second embodiment.

FIG. 11 is a flowchart illustrating an example of an operation of the vibration control device.

First, in step S1100, the frequency range setter 310 sets a frequency default value and a frequency range, for example, for each operation content corresponding to an operation button. The frequency range setter 310 performs such setting, based on operation target information received from the display controller 240. The operation target information is generated for each display image, and includes the coordinate range information 520 and the vibration necessity information 530 (see FIG. 8 and FIG. 9).

In step S1200, the predominant frequency acquirer 320 performs a predominant frequency determining process, and then proceeds to step S1300. The predominant frequency determining process is a process for determining a predominant frequency when the predominant frequency is present in surrounding sound. The details of the predominant frequency determining process will be described later.

In step S1300, the consonant sound determiner 330 determines whether or not a predominant frequency is present in the surrounding sound.

The consonant sound determiner 330 may determine whether or not the predominant frequency is present in the surrounding sound by, for example, determining whether or not the predominant frequency is notified. Furthermore, when the predominant frequency acquirer 320 generates a flag indicating the presence or absence of the predominant frequency, the consonant sound determiner 330 may determine, based on the flag, whether or not the predominant frequency is present in the surrounding sound.

The consonant sound determiner 330 proceeds to step S1400 when the predominant frequency is present in the surrounding sound (S1300: YES). The consonant sound determiner 330 proceeds to step S1500, which will be described later, when the predominant frequency is not present in the surrounding sound (S1300: NO).

In step S1400, the consonant sound determiner 330 determines the frequency of a sound which is in consonant with the sound at the predominant frequency as a candidate for the vibrational frequency (hereinafter, referred to as "vibrational frequency candidate) of the touch panel 220.

Specifically, the consonant sound determiner 330 multiplies each frequency ratio 442 described in the consonant sound frequency ratio list illustrated in FIG. 6 and the reciprocal of the frequency ratio 442 by the predominant frequency. Then, the consonant sound determiner 330 determines the calculation result as a vibrational frequency candidate group, and notifies the vibrational frequency setter 340 of the determination result.

In step S1500, the vibrational frequency setter 340 determines whether or not an operation which requires vibrational feedback to an operation (hereinafter referred to as a "vibration required operation") has been performed.

In the second embodiment, a determination as to whether or not a touch operation has been performed for a vibration required button is performed.

Specifically, the vibrational frequency setter 340 performs such a determination, based on the operation position information from the touch panel detector 250, and the coordinate range information 520 (see FIG. 8) and the vibration necessity information 530 (see FIG. 9) from the display controller 240.

That is, the vibrational frequency setter 340 determines whether or not the position of the touch operation is included in a coordinate range of any one of the operation buttons. When it is determined that the position of the touch operation is included in the coordinate range of any one of the operation buttons, the vibrational frequency setter 340 determines that a touch operation has been performed on the corresponding operation button. Then, the vibrational frequency setter 340 determines whether or not the operation button on which the touch operation has been performed is a vibration required button.

The vibrational frequency setter 340 proceeds to step S1600 when a vibration required operation has been performed (S1500: YES). The vibrational frequency setter 340 proceeds to step S2100, which will be described later, when the vibration required operation has not been performed (S1500: NO).

In step S1600, the vibrational frequency setter 340 determines whether or not the predominant frequency is present in the surrounding sound.

The vibrational frequency setter 340 may determine whether or not the predominant frequency is present in the surrounding sound by, for example, determining whether or not a vibrational frequency candidate has been notified. Furthermore, when the predominant frequency acquirer 320 generates a flag which indicates the presence or absence of the predominant frequency, the vibrational frequency setter 340 may determine, based on the flag, whether or not the predominant frequency is present in the surrounding sound.

When the predominant frequency is present in the surrounding sound (S1600: YES), the vibrational frequency setter 340 proceeds to step S1700. When the predominant frequency is not present in the surrounding sound (S1600: NO), the vibrational frequency setter 340 proceeds to step S1900, which will be described later.

In step S1700, the vibrational frequency setter 340 determines whether or not any one of the vibrational frequency candidates is included in the frequency range set for the content of the operation which has been performed.

Specifically, the vibrational frequency setter 340 obtains the frequency range and the frequency default value for the operation button on which the touch operation has been performed, from the regional frequency information 540 (see FIG. 10) notified by the frequency range setter 310. Then, the vibrational frequency setter 340 determines whether or not any one of the plurality of vibrational frequency candidates described as the vibrational frequency candidate group 460 (see FIG. 14) notified from the consonant sound determiner 330 is included in the obtained frequency range.

The vibrational frequency setter 340 proceeds to step S1800 when at least one of the vibrational frequency candidates is included in the frequency range (S1700: YES). The vibrational frequency setter 340 proceeds to step S1900, which will be described later, when none of the vibrational frequency candidates is included in the frequency range (S1700: NO).

In step S1800, when only one of the vibrational frequency candidates is included in the frequency range, the vibrational frequency setter 340 sets the vibrational frequency candidate as the vibrational frequency of the touch panel 220. When two or more of the vibrational frequency candidates are included in the frequency range, the vibrational frequency setter 340 sets the vibrational frequency candidate that is the closest to the frequency default value as the vibrational frequency of the touch panel 220.

The vibrational frequency of the touch panel 220 may vary within the set frequency range, according to variations in the predominant frequency. By setting the vibrational frequency candidate closest to the frequency default value as the vibrational frequency, a significant change in the vibrational frequency of the operation button can be avoided as much as possible. Thus, the discomfort provided to the operator can be reduced.

In step S1900, the vibrational frequency setter 340 sets the frequency default value as the vibrational frequency of the touch panel 220. This is because the predominant frequency is not present or because no consonant sound is present in the frequency range set for the operation button on which the touch operation has been performed.

For example, when a touch operation is performed on the fifth operation button 515 (see FIG. 7), the frequency range is a range of ±15% of 800 Hz, which is a range between 680 Hz and 920 Hz. No vibrational frequency candidate is included in the frequency range. Therefore, the vibrational frequency setter 340 sets the frequency default value set for the fifth operation button 515, which is 800 Hz, as the vibrational frequency of the touch panel 220.

The vibrational frequency setter 340 may preferentially make the touch panel 220 to vibrate at the frequency of a consonant sound, rather than within the frequency range set for the operation button. In this case, for example, the vibrational frequency setter 340 may ignore the frequency range, and set the consonant sound closest to the frequency default value as the vibrational frequency of the touch panel 220.

In step S2000, the vibrational frequency setter 340 causes the touch panel 220 to vibrate at the set vibrational frequency. Specifically, the vibrational frequency setter 340 generates a vibration instruction signal which instructs the vibration element 230 to vibrate for a specific period of time at the set vibrational frequency. Moreover, the vibrational frequency setter 340 outputs the generated vibration instruction signal to the vibration element controller 260.

In step S2100, the predominant frequency acquirer 320 determines whether or not it is a timing to end the processing for the same display screen. The processing for the same display screen represents processing for setting the vibrational frequency using the same regional frequency information 540 (see FIG. 10) generated in step S1100.

The predominant frequency acquirer 320 returns to step S1200 when it is not the timing to end the processing for the same display screen (S2100: NO), such as when the same display screen is maintained. When it is the timing to end the processing for the same display screen (S2100: YES), such as at a timing in which the display screen is being switched or at a timing in which the screen display is ending, the predominant frequency acquirer 320 ends the series of processing. When the display screen switches to a different screen which accepts a touch operation, the vibration control device 300 starts the processing from step S1100.

<Predominant Frequency Determining Process>

Figure 12:
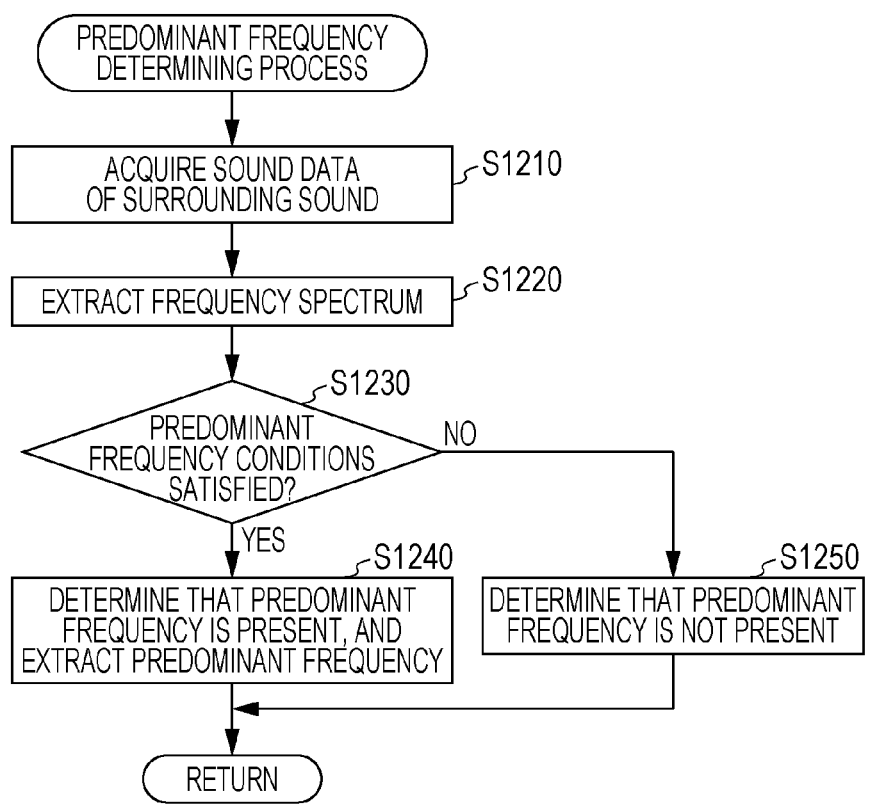
FIG. 12 is a flowchart illustrating an example of a predominant frequency determining process according to the second embodiment.

FIG. 12 is a flowchart illustrating an example of the predominant frequency determining process. First, in step S1210, the sound data acquirer 315 acquires sound data of the surrounding sound from the microphone 270.

Then, in step S1220, the predominant frequency acquirer 320 extracts a frequency spectrum of the sound pressure level by a spectral transform processing, such as Fourier transform, from the acquired sound data.

In step S1230, the predominant frequency acquirer 320 determines whether or not a frequency which satisfies the predominant frequency conditions 430 illustrated in FIG. 5 described above is present.

The predominant frequency acquirer 320 proceeds to step S1240 when the frequency which satisfies the predominant frequency conditions 430 is present (S1230: YES). The predominant frequency acquirer 320 proceeds to step S1250 when the frequency which satisfies the predominant frequency conditions 430 is not present (S1230: NO).

In step S1240, the predominant frequency acquirer 320 determines that the predominant frequency is present in the surrounding sound, and extracts the predominant frequency. Then, the process returns to the process of FIG. 11.

In step S1250, the predominant frequency acquirer 320 determines that the predominant frequency is not present in the surrounding sound. Then, the process returns to the process of FIG. 11.

<Frequency Spectrum of Surrounding Sound>

Figures 13, 14:
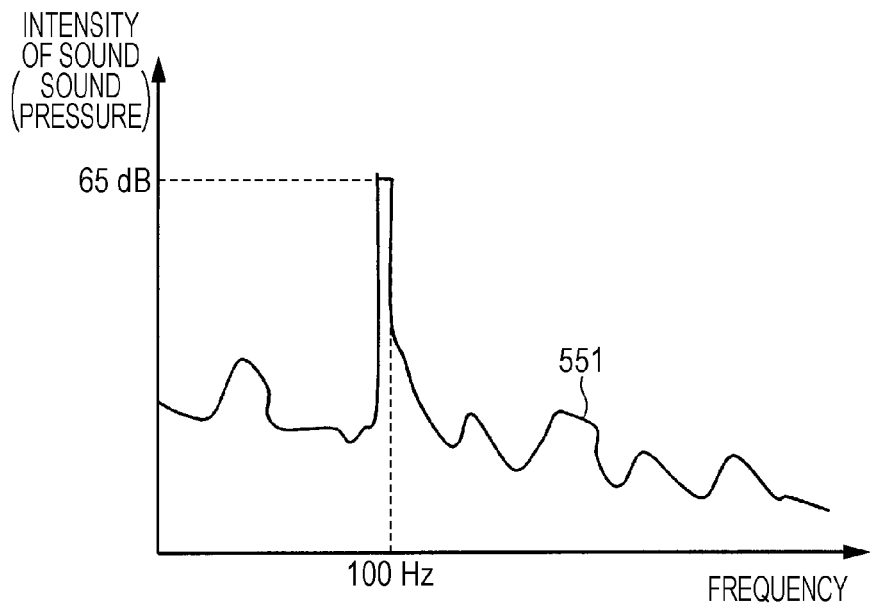
FIG. 13 is a spectrum diagram illustrating another example of a frequency spectrum of a sound pressure level in the second embodiment.
FIG. 14 is a diagram illustrating an example of a vibrational frequency candidate group in the second embodiment.

FIG. 13 is a diagram illustrating an example of a frequency spectrum of the surrounding sound extracted by the microphone 270. In FIG. 13, the horizontal axis represents frequency [Hz], and the vertical axis represents sound pressure level (intensity of sound) [dB]. This example indicates a case in which a relatively large surrounding sound close to a pure tone of 100 Hz is being produced with a sound pressure level of 65 dB in an area around the touch panel 220.

As illustrated in FIG. 13, in the case where a relatively large surrounding sound of 100 Hz is being produced, a frequency spectral curve 551 reaches the value of 65 dB, with the sound pressure level being predominant (outstanding) around 100 Hz. Such a surrounding sound at a frequency whose sound pressure level is outstanding compared to other frequencies is easily heard by people.

In the example illustrated in FIG. 13, the sound of 100 Hz is at "40 dB or more" and falls within the range of "20 Hz to 1000 Hz". Therefore, the sound of 100 Hz satisfies the predominant frequency conditions 430 illustrated in FIG. 5. Thus, the predominant frequency acquirer 320 extracts the frequency of 100 Hz as the predominant frequency.

The predominant frequency acquirer 320 does not necessarily use a graph of a continuous frequency spectrum as a method for extracting the predominant frequency. Discrete data (array) of a set of the frequency and the sound pressure level may be used. Furthermore, the predominant frequency acquirer 320 may use, as a method for extracting the predominant frequency, another parameter which indicates the intensity of the sound, such as the sound pressure (without unit), instead of the sound pressure level [dB].

<Vibrational Frequency Candidate Group>

FIG. 14 is a diagram illustrating an example of a vibrational frequency candidate group. In this example, the case in which 100 Hz is extracted as a predominant frequency will be described.

As illustrated in FIG. 14, the vibrational frequency candidate group 460 includes, for example, "50.0 Hz". This is a result obtained by multiplying 100 Hz by a ½ frequency ratio of a perfect octave. Furthermore, the vibrational frequency candidate group 460 includes, for example, "200.0 Hz". This is a result obtained by multiplying 100 Hz by 2, which is the reciprocal of the ½ frequency ratio of a perfect octave.

<Setting of Vibrational Frequency>

Figures 15, 16:
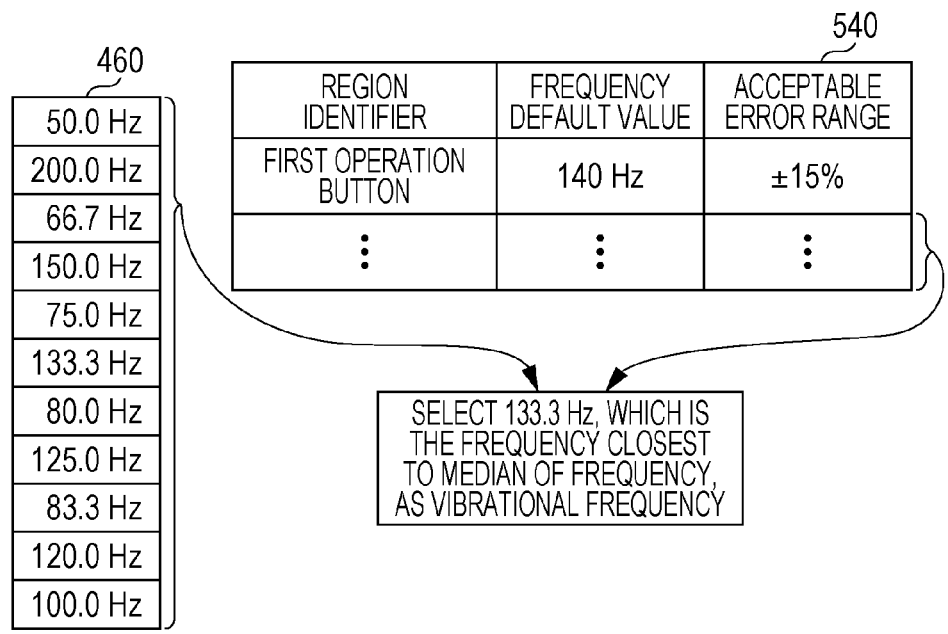
FIG. 15 is a diagram illustrating an example of how a vibrational frequency is set in the second embodiment.
FIG. 16 is a diagram illustrating another example of predominant frequency conditions in the second embodiment.

FIG. 15 is a diagram illustrating an example of how a vibrational frequency is set. In this example, the case in which a touch operation has been performed on the first operation button 511 (see FIG. 7) will be described.

As illustrated in FIG. 15, according to the regional frequency information 540 (see FIG. 10), the frequency range set for the first operation button 511 is a range of ±15% of 140 Hz, which is a range between 119 Hz and 161 Hz. According to the vibrational frequency candidate group 460 (see FIG. 14), five vibrational frequency candidates are included in the frequency range. Furthermore, among the five vibrational frequency candidates, "133.3 Hz" is the closest to the frequency default value 140 Hz.

Therefore, the vibrational frequency setter 340 sets 133.3 Hz as the vibrational frequency of the touch panel 220.

In the above description, various types of information which have been described as being notified to other device sections, may also be indirectly transferred by being stored in a memory which may be referenced from the other device sections. Conversely, various types of information which have been described as being stored in the memory which may be referenced from other device sections may also be directly notified to the other device sections.

CONCLUSION

As described above, in the touch panel input apparatus 100 according to the foregoing embodiments, the vibration control device 300 sets the frequency of panel vibrations for a touch operation in such a manner that the panel vibration sound is in consonant having a sound of a predominant frequency existing in the surrounding sound.

Accordingly, the touch panel input apparatus 100 according to the foregoing embodiments is able to maintain the vibrational frequency of the touch panel 220 within a band in which an operational feeling of a touch operation can be sufficiently obtained and to reduce annoying discomfort caused by the panel vibration sound. Furthermore, the touch panel input apparatus 100 according to the foregoing embodiments does not need to separately produce a high-frequency sound. That is, the touch panel input apparatus 100 according to the foregoing embodiments achieves a reduction of the discomfort caused by the panel vibration sound while maintaining an operational feeling of a touch operation on a touch panel in the use of the touch panel which vibrates in synchronization with a touch operation.

The predominant frequency conditions are not limited to the example illustrated in FIG. 5.

FIG. 16 illustrates another example of the predominant frequency conditions and corresponds to FIG. 5.

As illustrated in FIG. 16, in predominant frequency conditions 430a, for example, a duration time lower limit 433 of "500 msec" and a frequency acceptable error 434 of "±5%" are defined as predominant frequency conditions.

The duration time of "500 msec" corresponds to the shortest duration time of a sound whose musical interval can be perceived by people. Furthermore, the frequency acceptable error 434 of "±5%" corresponds to a half tone. The half tone represents a difference in musical interval between adjacent piano keys. A half tone is converted into a frequency ratio of, for example, 16:17, 17:18, 18:19, or 19:20. A sound which does not correspond to a half tone is difficult to perceive as a sound of a musical interval.

The predominant frequency acquirer 320 may also extract the predominant frequency by using the predominant frequency conditions 430a illustrated in FIG. 16, for example, along with the predominant frequency conditions 430 illustrated in FIG. 5. That is, when the predominant frequency is not stable, the predominant frequency acquirer 320 may also exclude the predominant frequency.

Specifically, as described below, first, the predominant frequency acquirer 320 performs predominant frequency extracting processing a plurality of times during the duration time lower limit 433. For example, the predominant frequency acquirer 320 regularly performs the predominant frequency extracting processing for each 100 msec. In this case, the predominant frequency acquirer 320 extracts a predominant frequency five times during 500 msec, which is the duration time lower limit 433. The predominant frequency acquirer 320 acquires the maximum value and the minimum value of the extracted multiple predominant frequencies. Then, when the obtained minimum value and maximum value of the predominant frequencies are included in the range of the frequency acceptable error 434, the predominant frequency acquirer 320 determines that the predominant frequency is stable. When at least one of the obtained minimum value and maximum value of the predominant frequencies is not included in the range of the frequency acceptable error 434, the predominant frequency acquirer 320 determines that the predominant frequency is not stable.

Accordingly, the predominant frequency acquirer 320 may add a condition that the sound has a sound pressure of a specific level or more within a specific bandwidth and a condition that the sound continues to have a sound pressure at a specific level or more over a specific period of time or longer, to the conditions for the predominant frequency.

Sounds which may constitute a consonant sound need to have a musical interval which can be perceived by people. When the bandwidth of a sound whose sound pressure is specific level or more exceeds a half tone, the sound is difficult to perceive as a sound of a musical interval. Furthermore, the musical interval of a sound with an extremely short duration time is difficult to perceive. A sound which is difficult to perceive as a sound of a musical interval is difficult to form a consonant sound. Therefore, the predominant frequency acquirer 320 is able to exclude the frequency of a sound which is difficult to perceive as a sound of a musical interval, such as a sound with a wide bandwidth or an extremely short sound, from a predominant frequency, by using the above predominant frequency conditions 430a.

A vibration control device according to the present disclosure that is used for a touch panel which vibrates in synchronization with a touch operation, includes a sound data acquirer that acquires sound data of a surrounding sound of the touch panel; a predominant frequency acquirer that extracts a predominant frequency of the surrounding sound from the acquired sound data; a consonant sound determiner that determines a consonant sound frequency based on the extracted predominant frequency, the consonant sound frequency being a frequency of a sound which is in consonant with a sound having the extracted predominant frequency; and a vibrational frequency setter that sets a vibrational frequency of the touch panel to the determined consonant sound frequency.

In the vibration control device, the vibrational frequency setter may determine whether or not the consonant sound frequency is included within a certain frequency range, set the vibrational frequency to the consonant sound frequency when the consonant sound frequency is included in the certain frequency range, and set the vibrational frequency to a frequency default value, which is a frequency included in the certain frequency range, when the consonant sound frequency is not included in the certain frequency range.

In the vibration control device, the certain frequency range may be a frequency range in which an operational feeling of the touch operation is obtainable when the vibrations of the touch panel are set within the certain frequency range.

In the vibration control device, the predominant frequency acquirer may determine whether or not the predominant frequency is present in the surrounding sound, and the vibrational frequency setter may set the vibrational frequency of the touch panel to the frequency default value when the predominant frequency is not present in the surrounding sound.

In the vibration control device, the predominant frequency acquirer may determine, based on predominant frequency conditions which define conditions for a predominant frequency are defined, whether or not the predominant frequency is present in the surrounding sound, and the predominant frequency conditions may include a condition that the predominant frequency is within a range of a frequency of a sound whose musical interval is perceivable by people.

In the vibration control device, the predominant frequency conditions may include at least one of a condition that the predominant frequency is a frequency of a sound which is within a specific frequency bandwidth and whose sound pressure is equal to or more than a specific level and a condition that the predominant frequency is a frequency of a sound whose sound pressure continues to have a specific level or more over a specific period of time or longer.

In the vibration control device, the consonant sound determiner may determine a value obtained by multiplying the extracted predominant frequency by a frequency ratio of two sounds constituting a consonant sound as the consonant sound frequency.

In the vibration control device, the frequency ratio of the two sounds constituting the consonant sound may include at least one of a frequency ratio of a perfect first, a frequency ratio of a minor third, a frequency ratio of a major third, a frequency ratio of a perfect fourth, a frequency ratio of a perfect fifth, a frequency ratio of a perfect eighth, and a frequency ratio obtained by multiplying or dividing each of the frequency ratios by an integer multiple of 2.

The vibration control device may further include a frequency range setter that acquires operation content which is able to be input by the touch operation and sets the frequency range and the frequency default value for the acquired operation content, and the frequency range setter may set different frequency ranges and different frequency default values for multiple operation contents.

A touch panel input apparatus according to the present disclosure includes a touch panel that receives a touch operation; a vibration generator that generates vibrations of the touch panel in synchronization with the touch operation; a sound data acquirer that acquires sound data of a surrounding sound of the touch panel; a predominant frequency acquirer that extracts a predominant frequency of the surrounding sound from the acquired sound data; a consonant sound determiner that determines a consonant sound frequency, which is a frequency of a sound which is in consonant with a sound having the extracted predominant frequency; and a vibrational frequency setter that sets a vibrational frequency of the touch panel to the determined consonant sound frequency.

A vibration control method according to the present disclosure used for a touch panel which vibrates in synchronization with a touch operation, includes acquiring sound data of a surrounding sound of the touch panel; extracting a predominant frequency of the surrounding sound from the acquired sound data; determining a consonant sound frequency, which is a frequency of a sound which is in consonant with a sound having the extracted predominant frequency; and setting a vibrational frequency of the touch panel to the determined consonant sound frequency.

The present disclosure is useful as a vibration control device, a touch panel input apparatus, and a vibration control method which are capable of reducing discomfort caused by a panel vibration sound while maintaining an operational feeling of a touch operation in the use of a touch panel which vibrates in synchronization with a touch operation. The present disclosure is suitable for, for example, electronic apparatuses including a smartphone, a tablet terminal, a car navigation, a refrigerator, a microwave oven, and a copying machine.

What is claimed is:

1. A vibration control device that is used for a touch panel which vibrates in synchronization with a touch operation, the device comprising:
   an input terminal that receives an input signal; and
   a control circuitry coupled to the input terminal, the control circuitry controls:
   acquiring sound data of a surrounding sound of the touch panel;
   extracting a predominant frequency of the surrounding sound from the acquired sound data;
   determining a consonant sound frequency based on the extracted predominant frequency, the consonant sound frequency being a frequency of a sound which is in consonant with a sound having the extracted predominant frequency; and
   setting a vibrational frequency of the touch panel to the determined consonant sound frequency,
   wherein the control circuitry determines whether or not the consonant sound frequency is included within a certain frequency range, sets the vibrational frequency to the consonant sound frequency when the consonant sound frequency is included in the certain frequency range, and sets the vibrational frequency to a frequency default value, which is a frequency included in the certain frequency range, when the consonant sound frequency is not included in the certain frequency range.

2. The vibration control device according to claim 1, wherein the certain frequency range is a frequency range in which an operational feeling of the touch operation is obtainable when the vibrations of the touch panel are set within the certain frequency range.

3. The vibration control device according to claim 1,
   wherein the control circuitry determines whether or not the predominant frequency is present in the surrounding sound, and
   wherein the control circuitry sets the vibrational frequency of the touch panel to the frequency default value when the predominant frequency is not present in the surrounding sound.

4. The vibration control device according to claim 3,
   wherein the control circuitry, based on predominant frequency conditions which define conditions for a predominant frequency, whether or not the predominant frequency is present in the surrounding sound, and
   wherein the predominant frequency conditions include a condition that the predominant frequency is within a range of a frequency of a sound whose musical interval is perceivable by people.

5. The vibration control device according to claim 4, wherein the predominant frequency conditions include at least one of a condition that the predominant frequency is a frequency of a sound which is within a specific frequency bandwidth and whose sound pressure is equal to or more than a specific level and a condition that the predominant frequency is a frequency of a sound whose sound pressure continues to have a specific level or more over a specific period of time or longer.

6. The vibration control device according to claim 1, wherein the control circuitry determines a value obtained by multiplying the extracted predominant frequency by a frequency ratio of two sounds constituting a consonant sound as the consonant sound frequency.

7. The vibration control device according to claim 6, wherein the frequency ratio of the two sounds constituting the consonant sound includes at least one of a frequency ratio of a perfect first, a frequency ratio of a minor third, a frequency ratio of a major third, a frequency ratio of a perfect fourth, a frequency ratio of a perfect fifth, a frequency ratio of a perfect eighth, and a frequency ratio obtained by multiplying or dividing each of the frequency ratios by an integer multiple of 2.

8. The vibration control device according to claim 1, wherein the control circuitry further controls:
   acquiring operation content which is able to be input by the touch operation and sets the frequency range and the frequency default value for the acquired operation content, wherein
   different frequency ranges and different frequency default values are set for multiple operation contents.

9. A touch panel input apparatus comprising:
   a touch panel that receives a touch operation; and
   control circuitry coupled to the touch panel, the control circuitry controls:
   generating vibrations of the touch panel in synchronization with the touch operation;
   acquiring sound data of a surrounding sound of the touch panel;
   extracting a predominant frequency of the surrounding sound from the acquired sound data;
   determining a consonant sound frequency based on the extracted predominant frequency, the consonant sound frequency being a frequency of a sound which is in consonant with a sound having the extracted predominant frequency; and setting a vibrational frequency of the touch panel to the determined consonant sound frequency, wherein the control circuitry determines whether or not the consonant sound frequency is included within a certain frequency range, sets the vibrational frequency to the consonant sound frequency when the consonant sound frequency is included in the certain frequency range, and sets the vibrational frequency to a frequency default value, which is a frequency included in the certain frequency range, when the consonant sound frequency is not included in the certain frequency range.

10. A vibration control method used for a touch panel which vibrates in synchronization with a touch operation, the method comprising:

acquiring sound data of a surrounding sound of the touch panel;

extracting a predominant frequency of the surrounding sound from the acquired sound data;

determining a consonant sound frequency based on the extracted predominant frequency, the consonant sound frequency being a frequency of a sound which is in consonant with a sound having the extracted predominant frequency; and setting a vibrational frequency of the touch panel to the determined consonant sound frequency, wherein the determining of the consonant sound frequency includes determining whether or not the consonant sound frequency is included within a certain frequency range, setting the vibrational frequency to the consonant sound frequency when the consonant sound frequency is included in the certain frequency range, and setting the vibrational frequency to a frequency default value, which is a frequency included in the certain frequency range, when the consonant sound frequency is not included in the certain frequency range.

* * * * *